(12) United States Patent
Swartzbeck et al.

(10) Patent No.: US 7,118,021 B2
(45) Date of Patent: Oct. 10, 2006

(54) BONDING FIXTURE

(75) Inventors: Gary William Swartzbeck, N. Huntingdon, PA (US); Paula Denise Freyer, Fombell, PA (US)

(73) Assignee: Siemens Power Generation, Inc., Orlando, FL (US)

( * ) Notice: Subject to any disclaimer, the term of this patent is extended or adjusted under 35 U.S.C. 154(b) by 306 days.

(21) Appl. No.: 10/724,326

(22) Filed: Nov. 26, 2003

(65) Prior Publication Data

US 2005/0109816 A1 May 26, 2005

(51) Int. Cl.
*B23K 37/00* (2006.01)

(52) U.S. Cl. .................................... 228/44.3

(58) Field of Classification Search .............. None
See application file for complete search history.

(56) References Cited

U.S. PATENT DOCUMENTS

| | | | | |
|---|---|---|---|---|
| 2,478,631 A | * | 11/1949 | Anderson | 269/160 |
| 3,139,816 A | * | 7/1964 | Volney et al. | 100/51 |
| 3,291,360 A | * | 12/1966 | Linnander | 228/44.3 |
| 5,423,473 A | * | 6/1995 | Dailey et al. | 228/44.3 |

* cited by examiner

*Primary Examiner*—Lynne R. Edmondson

(57) ABSTRACT

A tooling for affecting the repair of turbine blade tips which generates bond line loads as a result of differential thermal expansion between the work piece and the fixture. The fixture accommodates multiple work pieces of different sizes to facilitate a batch repair process and compressive load limits are established by insertion of deformable compression rings.

13 Claims, 3 Drawing Sheets

BONDING FIXTURE

BACKGROUND

1. Field of the Invention

This invention pertains, in general, to tooling which utilizes differential thermal expansion between fixture and workpiece components to impart a compressive load across a bond plane to affect a metallurgical bond.

2. Related Art

Costs for hot section nickel-based superalloy blades have increased as more sophisticated casting techniques and alloys, e.g., conventionally-cast, directionally-solidified and single crystal components, have been developed. Application of protective base coatings and thermal barrier coatings and the associated diffusion heat treatment schedules add to these costs.

Hot section components of gas turbines are subjected to severe service conditions, which include combinations of thermal and mechanical stresses that ultimately result in thermal mechanical fatigue cracking within the blade tip regions. For cost reasons, a method of repair or replacement of only the damaged tip segment, rather than replacement of the entire blade, is required. Damage blade tips are typically repaired using one of several weld procedures. Because of the difficulty in welding modern nickel-based superalloys, low strength, solid solution weld metal alloys are commonly used. However, the reduced mechanical properties of the weldment restrict repair to the lower stress regions of the blade. Other weld processes utilizing gamma prime strengthened filler materials at either ambient or elevated temperatures usually result in micro-fissuring of the weld metal and/or the heat affected zones. Further, costs associated with repairing one blade at a time are high.

Alternate bonding processes, e.g., diffusion welding, activated diffusion brazing, transient liquid phase bonding, have been developed which can produce near base metal properties. In addition to expanding the allowable repair regions of the blade, costs can be reduced significantly if bond tooling is developed which allows large batches of blades to be simultaneously repaired in conventional vacuum furnace systems. A requirement of this tooling would be the ability to apply hundreds of pounds per square inch to the bond planes of transient liquid phase bonds and thousands of pounds per square inch to the bond area of diffusion welded designs. Precise control of bond line loads is critical to the above-mentioned processes to achieve acceptable metallurgical quality.

Accordingly, it is an object of this invention to provide a low cost, high temperature tooling for transient liquid phase bonding or diffusion weld repair of gas turbine engine blade tips.

It is a further object of this invention to provide such high temperature tooling that can be employed to repair multiple blades at the same time in a batch process.

Additionally, it is an object of this invention to provide such high temperature tooling that can be employed to repair multiple blades of varying sizes in a batch process.

SUMMARY OF THE INVENTION

This invention achieves the foregoing objectives employing a tooling fixture having a tie arm base having a coefficient of thermal expansion relatively of the same order of magnitude as the component to be repaired. The tie arm base is structured to capture a portion of the component, such as the root of a turbine blade, on a first side of the bond line and extend up along at least two opposite sides of the component a given distance short of the other end of the component. A plurality of adjustment arms are spaced on opposite sides of the component and extend up from, and are attached to, the tie arm base. Each of the adjustment arms is constructed of a material having a coefficient of thermal expansion relatively of the same order of magnitude as that of the component being repaired. A tensioning arm is attached to each of the adjustment arms and extends up to a height above the top of the component. The tensioning arms are constructed of a material having a substantially lower coefficient of thermal expansion than that of the component being repaired. A top plate is situated over the top of the component and the tensioning arms, which are threaded through clearance holes or slots in the top plate. Fasteners are attached to the end portion of the tensioning arms for tightening the top plate down on the upper end of the component and imparting a preload sufficient to hold the component in position.

Preferably, the tooling fixture is sized to hold a plurality of components in compression so that they can be processed in a batch. Desirably, the top plates are separate for each component so that the fixture can accommodate components of different sizes. In the preferred embodiment, the lengths of the adjustment arms are adjustable to both accommodate components of different sizes as well as the extent of the tensioning arms below the top plate to control the rate and magnitude of the compression load which is imparted. A deformable compression ring is preferably inserted between the fastener and the top plate to control the maximum compression force exerted on the component.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
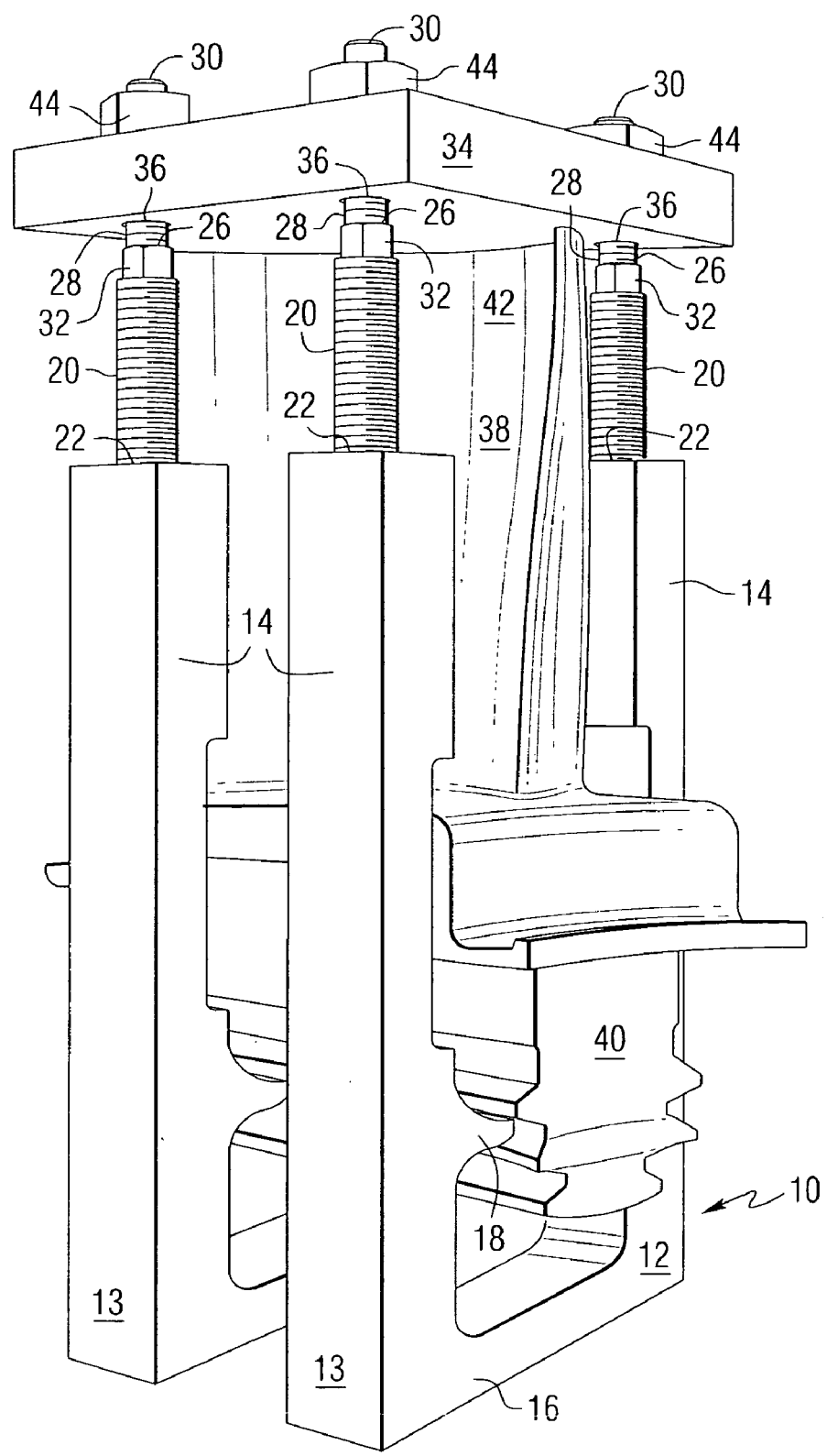
FIG. 1 is a perspective view of the tooling fixture of this invention supporting a turbine blade in compression.

The objective of this invention is to provide low cost, high temperature tooling for transient liquid phase bond or diffusion weld repair of gas turbine engine blade tips. However, the tooling concept of this invention is equally applicable to repair of a wide range of land and aero engine blade defects, and defects in other components, which may be produced as conventional castings, directionally-solidified castings or as single crystal castings.

The tooling of this invention utilizes differences in thermal expansion between fixture components and the work piece to generate the required bond line loads. Typical "delta alpha" type tooling, that is tooling that impart loads created by the difference in coefficient of thermal expansion of several alloys, produce a loading pattern that ramps up rapidly with temperature, generating extreme, uncontrolled loads, which can easily fracture fixture components or deform parts being bonded. As can be appreciated from FIGS. 1 through 4, the tooling fixture 10 of this invention utilizes materials for tie arms 12 and adjustment arms 20, which have coefficients of thermal expansion approximately equal to or at least in the same order of magnitude as the coefficient of thermal expansion of the component 38 which, in the application illustrated, is a turbine blade having a root section 40 and tip section 42. In this case, the tie arm base 12 and adjustment arms 20 are preferably constructed from a nickel base alloy such as MA 754, available from Special Metals Corporation, Huntington, W. Va. The nickel base alloy MA 754 has a temperature capability above 2000° F. (1,093° C.) and can withstand the vacuum furnace temperatures under which the bonding process will be performed. A short length of a tensioning arm 26, having a relatively low coefficient of thermal expansion, is used as an extension of the adjustment arm 20. The tensioning arm 26 is desirably constructed from a low expansion molybdenum alloy such as TZM, available from Thermal Shield, Los Altos, Calif., and is used as a thermal tensioner. The top plate 34, of either high or low expansion material, completes the capture of the work piece 38 and is secured by fastener nuts 44, which screw onto the top end 30 of the tensioning arm 26 to exert a compressive load, to hold the work piece 38 in position.

Figure 2:
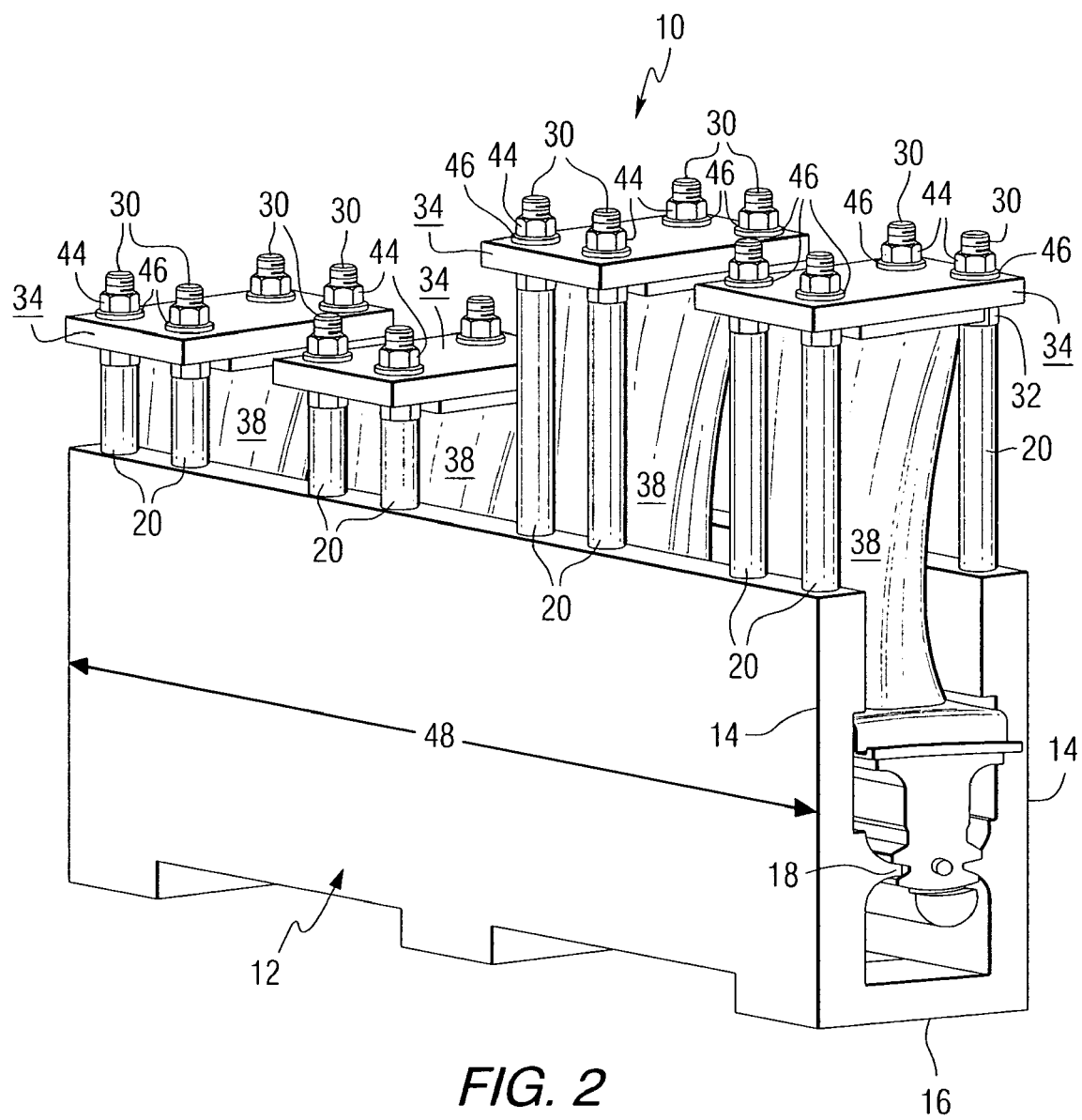
FIG. 2 is a perspective view of the tooling fixture previously illustrated in FIG. 1, which has been lengthened to accommodate the batch processing of multiple components.

As shown in FIG. 1, the tie arm base member 12 can be formed from a number of sections 13, though it should be appreciated that the sections may be joined to form a solid side wall as shown in FIG. 2. Each section 13 has two side members 14 that are connected at the base by a cross member 16 to form a U-shape member. The side portions 14 of the base member 12 have inwardly-extending projections 18, which oppose each other and mate with concave portions on the blade root 40 to anchor the blade root within the tooling fixture 10. The upper portion of the sides 14 of the base member 12 include, on their top surface, an annular threaded recess or hole within which a first end 22 of the adjustment arm 20 is threaded. The second end of the adjustment arm consists of a machined hex head 32, for easy adjustment or removal of the adjustment arm after completion of the bond process or for adjustment of the length of the tensioning arm. The tensioning arm has a complementary thread that mates with the internal thread of the adjustment arm hex head 32 at its first end 28. The second outwardly-threaded, threaded tensioning arm 26 extends through a clearance hole or slot 36 in the top plate 34 and is captured by an anchoring nut 44 on the top side of the top plate. The anchoring nut 44 can be screwed down against the top plate 34 to provide the desired compressive preload on the work piece 38.

Preferably, the tensioning arm 26 and anchoring nut 44 are constructed from materials having substantially the same coefficient of thermal expansion, so the threads are not damaged when the tooling fixture is heated. It should be appreciated that the adjustment arms 20 can be screwed further into or out of the tie arm base member sides 14 to accommodate different sizes of the work piece 38. Additionally, screwing the adjustment arms 20 into or out of the tie arm base member sides 14 can be used to change the length of the tensioning arm 26 that contributes to the compressive load on the work piece 38, and thus adjusts the magnitude and rate at which the load is applied, which is one of the important features of this invention. As a result, it is possible to establish fixture setups in which the bond line loads increase slowly with increasing temperature. Additionally, though the tensioning arm 26 is described as being screwed into the adjustment arm hex head, it should be appreciated that other attachment methods may be used.

FIG. 2 shows a tooling fixture that incorporates all of the concepts of the fixture shown in FIG. 1, except that the side walls 14 are substantially extended to a width 48 to accommodate multiple components of varying sizes. The fixture shown in FIG. 2 will facilitate batch processing of multiple components and will accommodate components of different sizes since a separate top plate 34 is provided for each component.

Figure 3:
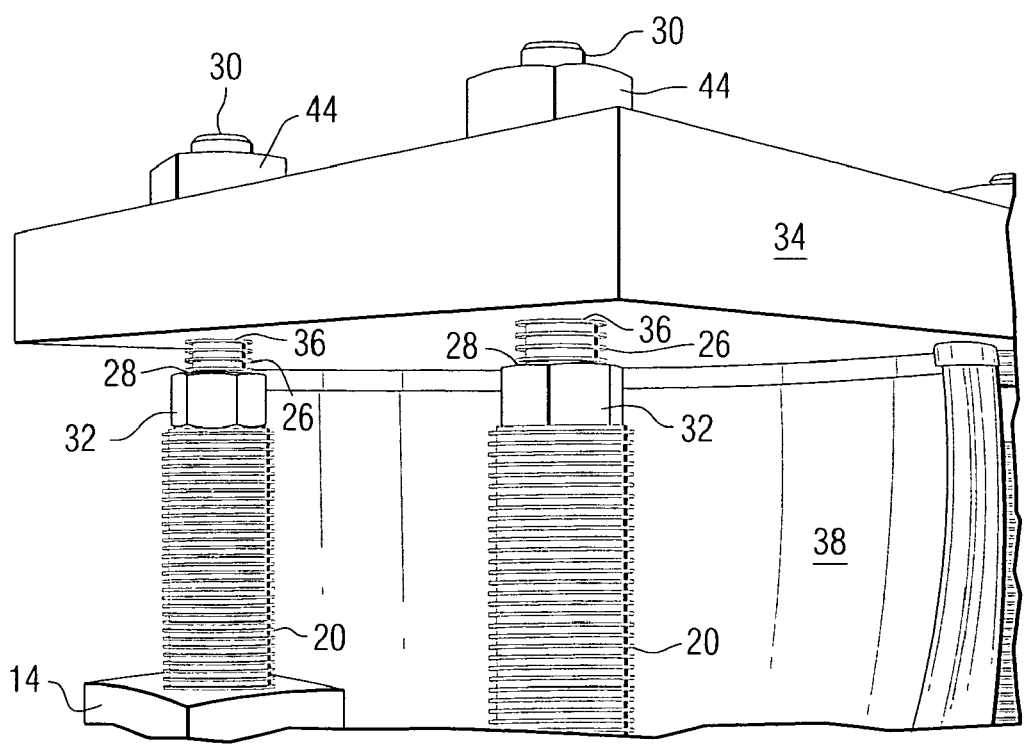
FIG. 3 is a perspective view of an enlarged upper portion of the tooling fixture shown in FIG. 1, providing a better view of the interface between the adjustment arms and tensioning arms.
Figure 4:
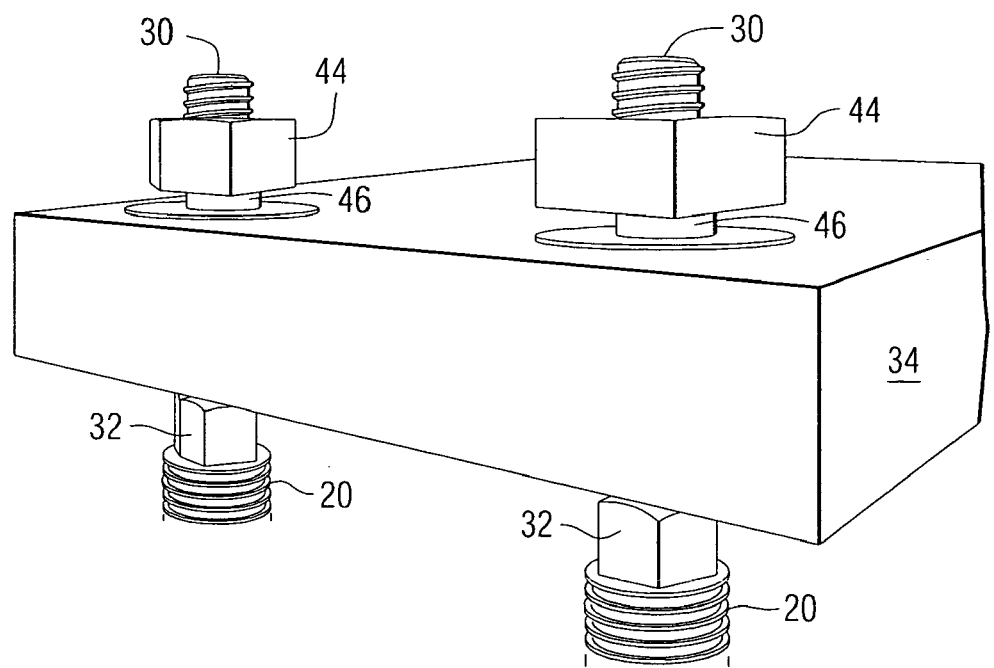
FIG. 4 is a side view of the top of the tooling fixture illustrated in FIG. 1, providing a better view of the deformable compression rings employed by this invention to control the maximum load to be imparted to the component under compression.

FIG. 3 shows a better view of the connection between the hex head 32 of the adjustment arm 20 and the tensioning arm 26.

The tooling concept of this invention allows application of a preload to the bond assembly such that part fit-up inspection prior to bonding is possible. Further, the preload allows fixture parts to be handled and charged into the furnace without fear of part movement within the fixture. To further control and/or limit the magnitude of the applied bond line load, deformable compression rings 46, shown in FIG. 4, can be added. The maximum desired bond line pressure is then determined approximately by the yield strength of the ring material and by its cross-sectional area. For high temperature applications in excess of 2000° F. (1,093° C.), alloy Haynes 230, available from Haynes International, Inc., Kokomo, Ind., or Incoloy 825, available from Special Metals Corporation, Huntington, W. Va., can be employed. At lower temperatures, INCO 600, available from Special Metals Corporation, and other similar materials, can be used.

The fixturing concept of this invention permits precise control over bond line pressures applied during repair of turbine blade tips, an application for which this tooling concept has been successfully demonstrated. The tooling accommodates placement of the bond line at any location along the airfoil. The allowable repair distance from the blade tip is a function of the mechanical properties of the bond process itself. To reduce processing costs in production, it is anticipated that several multiblade fixtures, such as that shown in FIG. 2, would be charged into the vacuum furnace, allowing simultaneous bonding of 18 to 24 blades per batch.

While specific embodiments of the invention have been described in detail, it will be appreciated by those skilled in the art that various modifications and alternatives to those details could be developed in light of the overall teachings of the disclosure. For example, the tie arm base member interior dimensions can be formed to accommodate other components having a different geometry than blades or vanes. Additionally, the adjustment arms can be bolts or other adjustable members whose lengths can be varied. Furthermore, the sides of the tie arm base can be extended to assume the function of the adjustment arms, with a loss of the adjustment capabilities that the adjustment arms provide. Accordingly, the particular embodiments disclosed are meant to be illustrative only and not limiting as to the scope of the invention, which is to be given the full breadth of the appended claims and any and all equivalents thereof.

What is claimed is:

1. A tooling fixture for applying a compressive load across a bond plane of a component having a predetermined coefficient of thermal expansion, as heat is applied to the component and the fixture, the tooling comprising:

a tie arm base, having a coefficient of thermal expansion relatively of the same order of magnitude as the predetermined coefficient of thermal expansion, structured to capture a portion of the component on a first side of the weld line and extend up along at least two opposite sides of the component a given distance short of another end of the component;

a plurality of adjustment arms spaced around the component, each having a coefficient of thermal expansion relatively of the same order of magnitude as the predetermined coefficient of thermal expansion, attached to the tie arm at the given distance and extending toward the other end of the component short of the other end of the component;

a plurality of tensioning arms, having a coefficient of thermal expansion substantially less than the predetermined coefficient of thermal expansion, respectively attached to each of the adjustment arms at an end of the adjustment arms closest to the other end of the component and extending past the other end of the component, a combination of the respective adjustment arms and tensioning arms extending to a second side of the weld line;

a top plate situated over the top of the component and connected to each of the tensioning arms; and fastening means attached to an end portion of the tensioning arms for tightening the top plate down on the other end of the component and imparting a preload sufficient to hold the component in position, wherein the tie arm base is common to and captures each of the components spaced from one another, and separate top plates and tensioning arms are provided for each component and each top plate is spaced from one another.

2. The tooling fixture of claim 1 wherein the length of the adjustment arms is adjustable.

3. The tooling fixture of claim 2 wherein the lengths of the adjustment arms are adjustable by the extent the adjustment arms are individually screwed into the tie arm base.

4. The tooling fixture of claim 2 whereas the adjustment of the tensioning arm and adjustment arm length allows control of the rate of change and magnitude of the applied bond plane load during a bond cycle.

5. The tooling fixture of claim 1 including a deformable compression ring inserted between the fastening means and the top plate for limiting the load applied to the work component.

6. A tooling fixture for applying a compressive load across a bond plane of a component having a predetermined coefficient of thermal expansion, as heat is applied to the component and the fixture, the tooling comprising:

a tie arm base, having a coefficient of thermal expansion relatively of the same order of magnitude as the predetermined coefficient of thermal expansion, structured to capture a portion of the component on a first side of the weld line and extend up along at least two opposite sides of the component a given distance short of another end of the component;

a plurality of adjustment arms spaced around the component, each having a coefficient of thermal expansion relatively of the same order of magnitude as the predetermined coefficient of thermal expansion, attached to the tie arm at the given distance and extending toward the other end of the component short of the other end of the component;

a plurality of tensioning arms, having a coefficient of thermal expansion substantially less than the predetermined coefficient of thermal expansion, respectively attached to each of the adjustment arms at an end of the adjustment arms closest to the other end of the component and extending past the other end of the component, a combination of the respective adjustment arms and tensioning arms extending to a second side of the weld line;

a top plate situated over the top of the component and connected to each of the tensioning arms;

fastening means attached to an end portion of the tensioning arms for tightening the top plate down on the other end of the component and imparting a preload sufficient to hold the component in position; and a deformable compression ring inserted between the fastening means and the top plate for limiting the load applied to the work component, wherein the deformable compression ring is constructed from a material selected from a group of alloys comprising Haynes 230, Incoloy 825 and INCO 600.

7. The tooling fixture of claim 1 wherein the component is a gas turbine blade.

8. The tooling fixture of claim 7 wherein the tie arm base and the adjustment arm are constructed from nickel base MA 754.

9. The tooling fixture of claim 7 wherein the tensioning arm is constructed from TZM (a molybdenum based alloy).

10. The tooling fixture of claim 7 wherein the top plate is constructed out of either nickel base MA 754 or TZM.

11. The tooling fixture of claim 1 wherein the adjustment arm and the tensioning arm have, external threads.

12. The tooling fixture of claim 1 wherein the fastening means is a load nut that is screwed down on an exposed end of the tensioning arm.

13. A tooling fixture for applying a compressive load across a bond plane of a component having a predetermined coefficient of thermal expansion, as heat is applied to the component and the fixture, the tooling comprising:

a tie arm base structured to capture a portion of the component on a first side of the weld line and extend up along at least two opposite sides of the component a given distance short of another end of the component;

a plurality of adjustment arms spaced around the component attached to the tie arm at the given distance and extending toward the other end of the component short of the other end of the component;

a plurality of tensioning arms respectively attached to each of the adjustment arms at an end of the adjustment arms closest to the other end of the component and extending past the other end of the component, a combination of the respective adjustment arms and tensioning arms extending to a second side of the weld line;

a top plate situated over the top of the component and connected to each of the tensioning arms; and fastening means attached to an end portion of the tensioning arms for tightening the top plate down on the other end of the component and imparting a preload sufficient to hold the component in position, wherein the component is a gas turbine blade, and wherein the tie arm base and the adjustment arm are constructed from nickel base MA 754, or the tensioning arm is constructed from TZM (a molybdenum based alloy), or the top plate is constructed out of either nickel base MA 754 or TZM.

* * * * *